United States Patent [19]

Stepp et al.

[11] Patent Number: 4,535,461
[45] Date of Patent: Aug. 13, 1985

[54] DIGITAL CLOCK BIT SYNCHRONIZER

[75] Inventors: Elvin D. Stepp, Fairfield; Gary L. Claypoole, West Chester, both of Ohio

[73] Assignee: Cincinnati Electronics Corporation, Cincinnati, Ohio

[21] Appl. No.: 500,088

[22] Filed: Jun. 1, 1983

[51] Int. Cl.³ .............................................. H04L 7/02
[52] U.S. Cl. .................................. 375/110; 375/119; 328/72
[58] Field of Search ................. 375/95, 106, 110, 119, 375/120; 360/51; 340/825.2; 370/100; 328/72, 73, 74, 155; 307/511, 516, 518, 527; 331/1 A, 14

[56] References Cited

U.S. PATENT DOCUMENTS

| | | | |
|---|---|---|---|
| 3,230,457 | 1/1966 | Soffel | 375/82 |
| 3,514,702 | 5/1970 | Nahay et al. | 375/82 |
| 3,611,298 | 10/1971 | Jacobson | 340/825.65 |
| 3,676,793 | 7/1972 | Brown | 331/1 A |
| 3,840,821 | 10/1974 | Conway | 331/14 |
| 4,012,598 | 3/1977 | Wiley | 328/72 |
| 4,131,856 | 12/1978 | Chapman | 328/72 |
| 4,276,650 | 6/1981 | de Jager et al. | 375/110 |
| 4,370,748 | 1/1983 | Janc et al. | 375/95 |
| 4,376,309 | 3/1983 | Fenderson et al. | 375/110 |

Primary Examiner—Benedict V. Safourek
Attorney, Agent, or Firm—Lowe, King, Price & Becker

[57] ABSTRACT

A clock wave is synchronized to the frequency of serial binary data bits. Digital circuitry derives a clock wave by responding to the data bits to selectively (a) increment a reference frequency, (b) decrement the reference frequency, and (c) not change the reference frequency. The digital circuitry divides each data bit into an even number of sub-bits. The binary value associated with a first half of the divided sub-bits of a particular data bit is compared with the binary value associated with a second half of the divided sub bits of the particular data bit. In response to the derived clock wave and the comparison, the reference frequency is derived, incremented or decremented. The frequency of the source is respectively incremented and decremented in response to first and second relations of the binary value associated with the first half relative to the binary value associated with the second half. The frequency of the source is not changed when the binary values associated with the first and second halves are equal.

19 Claims, 4 Drawing Figures

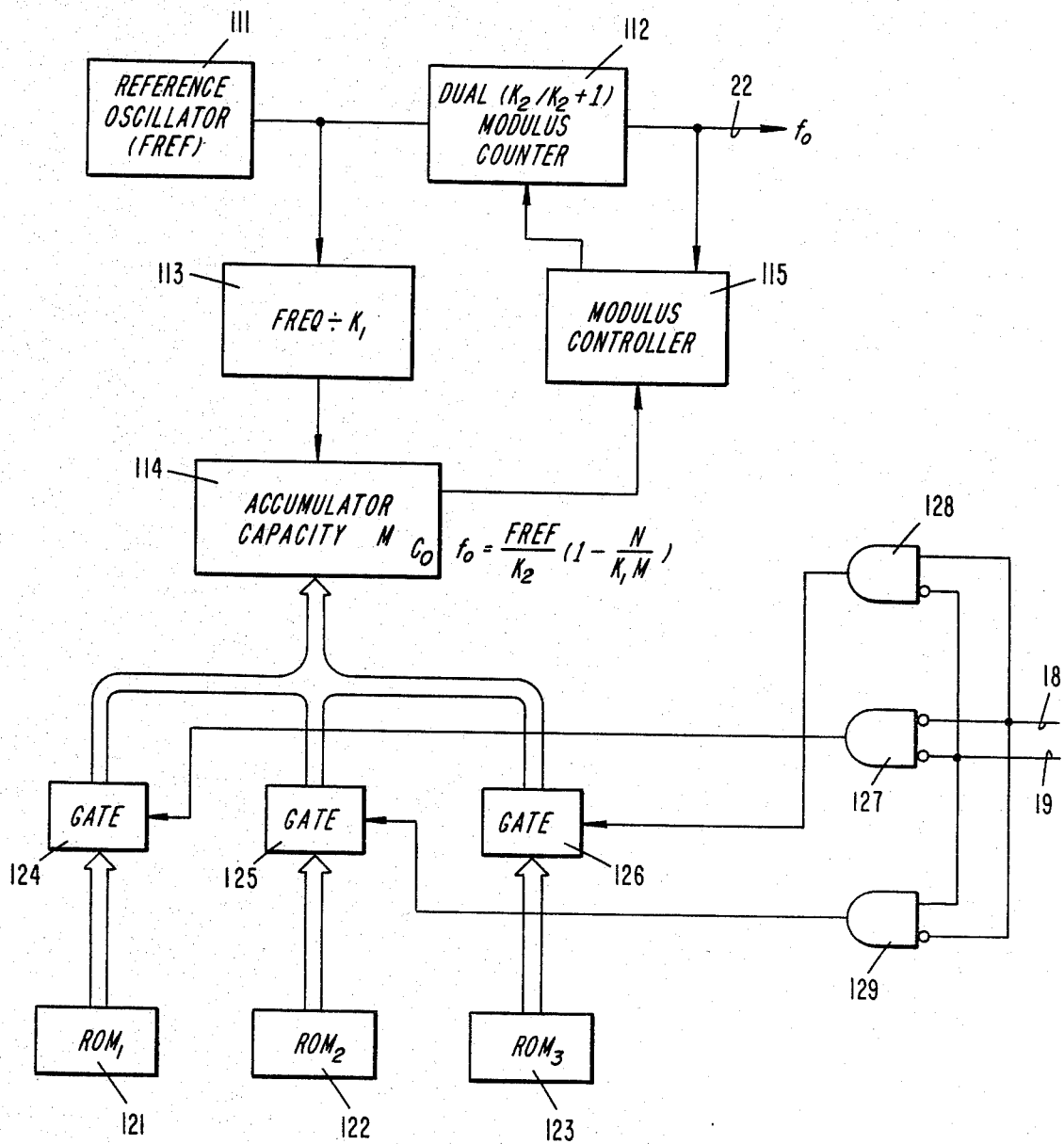

4,535,461

DIGITAL CLOCK BIT SYNCHRONIZER

TECHNICAL FIELD

The present invention relates generally to apparatus for synchronizing a clock wave to the frequency of serial data bits, and more particularly, to such an apparatus wherein digital circuit means divides each data bit into an even number of sub bits, wherein the binary value associated with a first half of the divided sub bits of a particular data bit is compared with the binary value associated with a second half of the divided sub bits of the particular data bit.

BACKGROUND ART

For certain transmission systems, it is necessary to derive a clock wave that is synchronized to the frequency of serial binary data bits derived in response to a received signal. In particular, such a synchronized clock wave is necessary for certain types of data detection systems and techniques.

In the prior art, it has been the general practice to employ analog techniques for providing such a result. Such techniques have frequently used so called early/late gates, wherein the energy in a first half of a received data bit is compared with the energy in the second half of the bit. The energy in each bit half is derived by analog integration circuitry. When a bit is completed, the resulting pair of integrated analog values is compared to derive an error signal having a polarity and perhaps magnitude indicative of the deviation between the energy in the two bit halves. The error signal controls the frequency and phase of a clock wave so that the clock wave is synchronzied with the data bits. The analog integration circuitry includes classical integrate/dump and sample/hold elements.

The prior art analog systems suffer from the usual problems of analog systems. Expensive components, such as precision operational amplifiers and stable capacitors, are required for high performance. A certain amount of error is introduced because of the finite time required to discharge capacitors included in the integrators. Component values change as a function of temperature and time, to reduce accuracy and performance characteristics. It is also difficult for analog circuitry to provide high performance for data signal patterns having many transitions, as well as a relatively low number of transitions. This is because the analog circuitry frequently has problems tracking high frequencies and capacitors employed in analog integrators are often incapable of holding the same charge for extensive time periods.

It is, accordingly, an object of the present invention to provide new and improved digital circuitry for synchronizing a clock wave to the frequency of serial binary data bits.

Another object of the invention is to provide a relatively inexpensive, accurate and stable apparatus for synchronizing a clock wave to the frequency of serial binary data bits.

Another object of the present invention is to provide a new and improved apparatus for synchronizing a clock wave to the frequency of serial binary data bits that are subject to frequent transitions, as well as to few transitions.

DISCLOSURE OF INVENTION

In accordance with the present invention, a clock wave is synchronized to the frequency of serial data bits by providing digital circuit means for selectively (a) incrementing a reference frequency, (b) decrementing the reference frequency, and (c) not changing the reference frequency. The digital circuit means thus derives the clock wave. The digital circuit means includes means responsive to the derived clock wave for dividing each data bit into an even number of sub bits. The binary value associated with a first half of the divided sub bits of a particular data bit is compared with the binary value associated with a second half of the divided sub bits of the particular data bit. Control means responds to the derived clock wave and the compared values for respectively incrementing and decrementing the reference frequency in response to first and second relations of the binary values associated with the two halves; the reference frequency is not changed when the binary values associated with the two halves are equal.

By dividing each data bit into an even number of sub bits and comparing the binary value associated with a first half of the sub bits of a particular data bit with a binary value associated with a second half of the divided sub bits of the particular data bit, the need for analog integration circuitry is obviated. Such digital processing of the sub data bits avoids the deleterious performance of the prior art analog circuits when such circuits are responsive to data patterns having few transitions. The digital circuitry inherently includes memory which prevents the clock wave frequency from wandering. In addition, the digital circuitry responds to each data bit and thus handles each data bit individually, regardless of the rate of data transitions. In contrast, an analog capacitor memory capable of preventing wandering of the clock wave frequency when there are few transitions in the serial input data bits is incapable of the fast response time required when adjacent data bit values change.

The results of the comparison operation can be used to control the frequency of a variable frequency divider responsive to the reference frequency source directly. However, such operation is not considered to be optimum because of certain factors.

In particular, there is a tendency for bias, due to data polarity, to be introduced in an output signal derived by a comparator for the binary values associated with the two groups of sub bits. To obviate such bias, the comparing means derives first and second complementary output signals. The first and second signals respectively have first and second binary values in response to the binary value associated with a first half of the sub bits exceeding the binary value associated with a second half of the sub bits. The first and second signals respectively have second and first values in response to the binary values associated with the second half exceeding the binary value associated with the first half. First and second EXCLUSIVE OR gate means respectively respond to the first and second signals and the data bits for deriving first and second output signals that are supplied to the control means. At the end of each data bit, as indicated by an output of the clock wave, the first and second signals are latched, to control whether the reference frequency is to be incremented, decremented or not changed during the next binary data bit.

To provide stability for the clock wave, the clock wave frequency is stepwise incremented or decremented to frequencies respectively above and below the reference frequency. Such stepwise control of the clock wave frequency provides stability to the clock wave frequency.

Stability is also attained by effectively integrating the results of the comparison operation. In particular, the reference frequency is incremented only in response to the number of data bits which cause the reference frequency to be incremented exceeding the number of data bits causing the reference frequency to be decremented by a predetermined value in excess of one. The reference frequency is decremented similarly, only in response to the number of data bits causing the reference frequency to be decremented exceeding the number of data bits causing the reference frequency to be incremented by a predetermined magnitude in excess of one. The predetermined value and predetermined magnitude in excess of one are typically the same and are considerably in excess of one, such as four or five. Thus, there is no change in the frequency of the clock wave until there has been a net number of binary data bits in excess of the predetermined value or magnitude.

Stability is enhanced by using several additional features. In particular, the reference frequency is incremented and decremented for the period of only one data bit. The clock wave is then derived at the reference frequency for at least one data bit period. Also, if successive data bits have the same value, the second such successive data bit can not cause the reference frequency to be incremented or decremented.

When the system of the present invention was originally designed, the phase of the clock wave was controlled exclusively in response to the reference frequency source, as well as binary signals indicating whether the reference frequency should be incremented, decremented, or maintained constant. It was found that the system, as originally designed, sometimes produced misalignment between the derived sub bits and the incoming data bits. Such misalignment caused skew in the locking range of the clock wave. In addition, there was a jitter tendency. It was found that these problems could be obviated by resynchronizing the clock wave to an edge of the serial binary data bits.

Originally, the comparator indicated if the binary value associated with the first half of the data bits was greater or less than the value associated with the second half of the data bits. It was found that control exclusively in response to such indications sometimes caused jitter of the clock wave, particularly for a low bit error ratio, which causes relatively significant numbers of equal valued results. To obviate the problem, if the first and second half values are the same, a signal is derived to inhibit incrementing or decrementing.

It is, accordingly, another object of the present invention to provide a new and improved digitally controlled apparatus for synchronzing a clock wave to the frequency of serial binary data bits wherein there are substantial improvements in skew and jitter characteristics.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 3 is a block diagram of a digital controlled oscillator included in the circuit of FIG. 1.

BEST MODE FOR CARRYING OUT THE INVENTION

Figure 1:
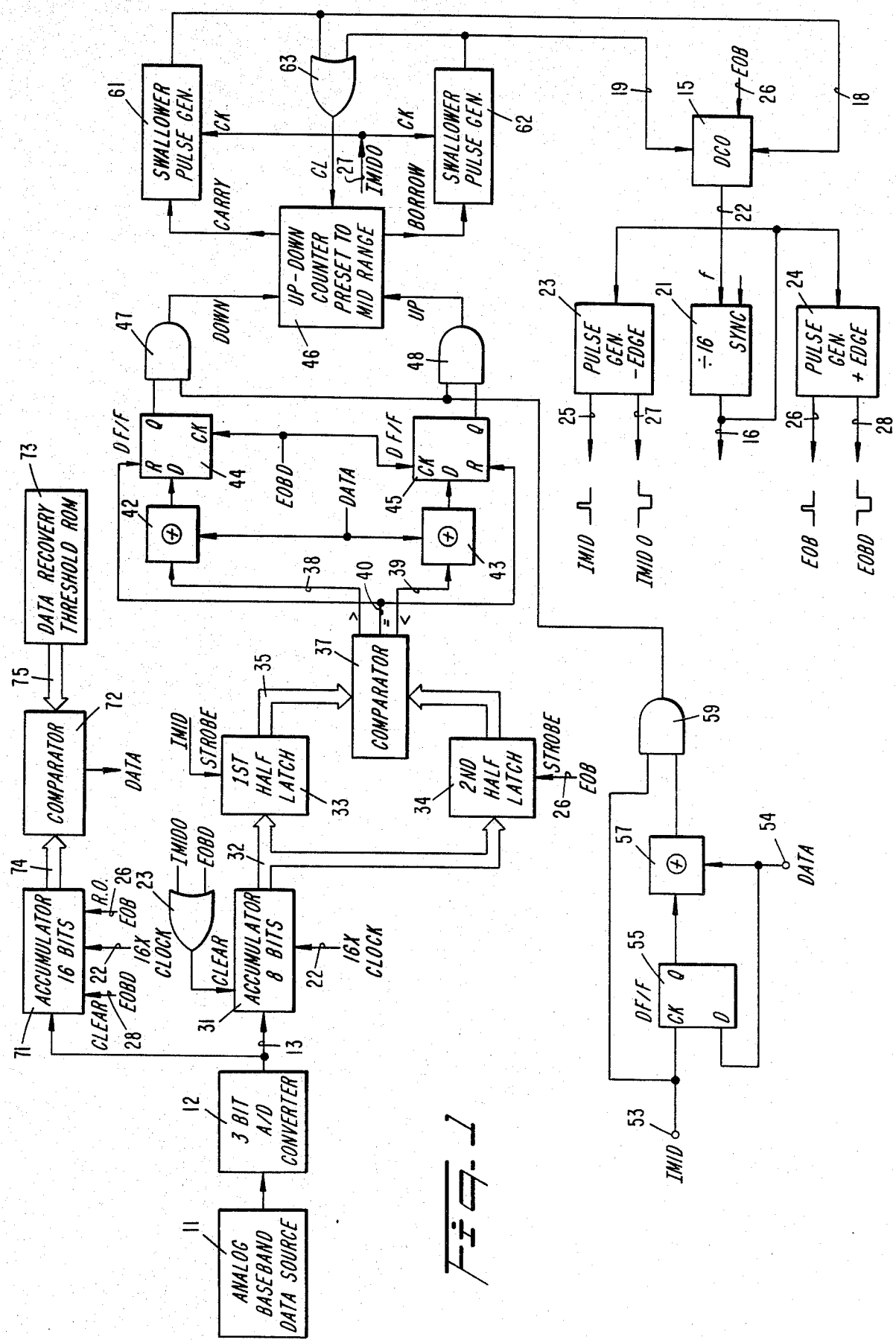
FIG. 1 is a circuit diagram of a preferred embodiment of the invention.

Reference is now made to FIG. 1 of the drawing wherein analog base band data source 11, such as derived from a radio carrier recovery loop, derives a variable amplitude AC signal. The signal derived from source 11 is sampled many times during each cycle thereof and the amplitude of each sample is converted into a digital signal by flash digital to analog converter 12. In response to each sampled value of source 11, converter 12 supplies to lead 13 a three-bit nonreturn to zero binary signal, having bit values representing the sampled amplitude of the signal derived from source 11. Because converter 12 is of the flash, i.e., parallel comparator, type, there is no predetermined sampling interval associated with it. Instead, each time the amplitude of source 11 changes value sufficiently so that it goes into a different range value of converter 12, a different three-bit signal indicative of that range is supplied by the converter to lead 13.

The signals on leads 13 and 14 control the frequency of a square, clock wave supplied by digital controlled oscillator 15 to lead 22. The signal on lead 22 has a frequency sixteen times that of the output frequency of converter 12, so that there are 32 transitions of the square clock wave on lead 22, for each data bit supplied by converter 12 to lead 13. The phases of the signal on leads 13 and 22 are synchronized, so that the leading edge of each data bit supplied by converter 12 to lead 13 occurs substantially simultaneously with the leading edge of a wave on lead 22.

Digital control oscillator 15 normally derives a reference frequency which has sixteen periods each time one bit is derived from converter 12. Oscillator 15 responds to binary signals on leads 18 and 19, respectively commanding incrementing and decrementing of the reference frequency in steps, i.e., by fixed amounts. In response to the binary signals on leads 18 and 19 both being equal to zero, the signal on lead 22 is at the reference frequency, $f_0$. In response to the signal on lead 18 having a binary one value, which implies a binary zero value for the signal on lead 19, oscillator 15 is activated so the frequency on lead 22 is equal to $f_0 + \Delta f_1$. In contrast, in response to the signal on lead 19 having a binary one value, which implies a binary zero value for the signal on lead 18, oscillator 15 is activated so the signal on lead 22 is $f_0 - \Delta f_2$. The values of $\Delta f_1$ and $\Delta f_2$ can be equal, but this is not necessarily the case. The manner in which the binary signals are derived on leads 18 and 19 is discussed infra, and is a major feature of the present invention.

The frequency supplied by oscillator 15 to lead 22 controls digital circuitry for deriving the binary signals on leads 18 and 19. The square wave on lead 22 is frequency divided by a factor of sixteen by frequency divider 21, having an output lead 16. Oscillator 15 is responsive to the signals on leads 18 and 19 so that the leading, positive going edges on lead 16 are in phase with the beginning (and therefore end) of each data bit supplied by converter 12 to lead 13. The trailing, negative going edges on lead 16 are in phase with the center or midpoint of each data bit on lead 13. It is necessary to derive control signals synchronized with the midpoint and end of each bit derived by converter 12. To enable the midpoint and end of each bit derived by converter 12 to be time coincident with negative and positive going edges of the wave on lead 16, input terminals of pulse generators 23 and 24 are respectively responsive to the negative and positive going edges of the square wave on lead 16. In response to the negative and positive going edges of the square wave on lead 16, pulse generators 23 and 24 respectively supply short duration positive pulses to leads 25 and 26. The positive going leading edges of the pulses on leads 25 and 26 thereby are respectively synchronized with the middle and end of each data bit derived by converter 12.

Pulse generators 23 and 24 also respectively respond to the negative and positive going edges on lead 16 to derive negative going pulses on leads 27 and 28. The pulses on leads 27 and 28 are longer than the pulses on leads 25 and 26 but have a duration that is considerably less than the duration of one-half of each data bit supplied by converter 12 to lead 13. The positive going, trailing edges of the negative pulses on leads 27 and 28 are therefore synchronized with the positive going edges on leads 25 and 26, respectively, but the positive going edges on leads 27 and 28 are delayed relative to the positive going edges on leads 25 and 26. Thereby, the positive going edges on leads 27 and 28 are referred to as delayed mid bits and delayed end of bits or IMIDD and EEOBD, respectively; in contrast, the positive going edges on leads 25 and 26 are referred to as IMID and EOB, respectively.

Because of the possibility of a bias on the alignment of sample clock pulses supplied by frequency divider 21 to lead 16, which results in skewing in the locking range of oscillator 15, frequency divider 21 is synchronized by the EOB edge on lead 26 at the beginning of each data bit on lead 14. Such synchronization modifies the phase of the square waves supplied by frequency divider 21 to lead 16, so that there is a precise time relationship between the leading edge of the square waves derived by divider 21 and the transitions in the data bits on lead 13. It has been found experimentally that such synchronization is necessary because of the integrally non-related variable rate at which signals are supplied by source 11 to converter 12. It has also been found experimentally that such synchronization avoids jitter which might otherwise result in the output of oscillator 15 and divider 21.

During the interval while sixteen square waves are supplied by oscillator 15 to lead 22, one data bit is supplied by converter 12 to lead 13. Each of the sixteen square waves on lead 22 causes the binary value of the data bit on lead 13 to be sampled so 16 sub bits are effectively derived during each data bit on lead 13. The eight sampled values for the first eight square waves supplied to lead 22 during each data bit are compared with the eight sampled values for the last eight square waves supplied to lead 22 during each data bit. If the 16 square waves supplied to lead 22 are synchronized exactly to the single data bit supplied to lead 13, the binary value of the first eight sampled bits on lead 13 is equal to the binary value of the last eight sampled values on lead 13. If, however, there is not exact synchronization between the square waves on lead 22 and there is a transition in the value of adjacent data bits on lead 13, the sampled values on lead 13 during the first eight square waves on lead 22 differ from the sampled values on lead 13 for the last eight square waves on lead 22.

The values of the eight sampled values during the first half of the data bit are compared with the eight sampled values during the last half of the data bit. In response to the first half sampled values being equal to the second half sampled values, binary zero values are supplied to leads 18 and 19. If, however, there is a mis-synchronization between a data bit on lead 13 and the 16 pulses derived on lead 22 for a particular data bit, a binary one signal is supplied to lead 18 or 19. In particular, in response to the data bit on lead 13 lagging the clock pulses on lead 22 and a transition occurring between adjacent data bits, the first eight sampled values on lead 13 during a particular data bit all have the same value, while only some of the last eight sampled values on lead 13 for the particular data bit have the same value. In an opposite manner, if a particular data bit on lead 13 leads the square wave sampling of pulses on lead 22 and a transition occurs between adjacent data bits, all of the sampled values on lead 13 during the last half of the particular data bit are the same while some of the sampled values on lead 13 during the first half of the particular data bit differ from each other.

To sample the sixteen values during a particular data bit and enable the values of the first eight samples to be compared with the values of the second eight samples to determine if synchronization exists between the particular data bit on lead 13 and the sixteen clock pulses on lead 22, the signal on lead 13 is supplied to a data input of eight bit accumulator register 31, having a clock input responsive to the pulses on lead 22. The contents of accumulator 31 are constantly supplied in parallel to bus 32. The accumulator 31 is cleared slightly after the middle and end of each bit on lead 13. To these ends, the delayed mid bit and delayed end of bit edges IMIDD and EOBD on leads 26 and 27 are combined in OR gate 33, having an output supplied to read out and clear input terminal of accumulator register 31. Register 31 thus derives an eight bit signal at the middle and the end of each data bit on lead 13. Each of the eight bit signals indicates the binary sampled values on lead 13.

The eight bit signal on bus 32 is applied to first half latch network 33 and second half latch network 34. Latch networks 33 and 34 are of identical construction, each including eight storage elements, a strobe input and an eight bit output bus; busses 35 and 36 are respectively at the outputs of latch networks 33 and 34. Each of the storage elements in latch networks 33 and 34 derives a constant output signal, equal to the value of the signal on bus 32 when the particular latch network is strobed. First and second half latch networks 33 and 34 are respectively strobed by the leading, positive going edges IMID and EOB, on leads 25 and 26. Thereby, the signals on busses 35 and 36 respectively indicate the sampled binary values during the eight sampling intervals of the first and second halves of each data bit on lead 13.

The magnitudes of the signals on busses 35 and 36 are compared by comparator 37. Comparator 37 includes first and second eight terminal inputs, respectively responsive to the eight bits on busses 35 and 36. In response to the value of the binary signal on bus 35 exceeding the value of the binary signal on bus 36, comparator 37 supplies a binary one value to output lead 38 thereof. In contrast, in response to the binary value of the signal on bus 36 exceeding the binary value of the signal on bus 35, comparator 37 supplies a binary one signal to lead 39. In response to the values of the signals on busses 35 and 36 being equal, comparator 37 supplies a binary one signal to lead 40. Thus, binary one signals are derived on leads 38, 39 and 40 on a mutually exclusive basis.

If there is synchronization between a particular data bit on lead 13 and the clock square wave on lead 16, the sampled values loaded into latches 33 and 34 during a particular data bit are the same, whereby a binary one signal is supplied by comparator 37 to lead 40. If the data bit on lead 13 has a binary value of one and the data bit respectively leads and lags the square wave on lead 16, binary one signals are supplied by comparator 37 to leads 39 and 38. Conversely if the data bit on lead 13 has a binary zero value, lagging and leading data bits respectively cause binary one signals to be derived on leads 39 and 38.

To enable the system to be insensitive to the binary value of a particular data bit on lead 13, the signals on leads 38 and 39 are respectively combined in EXCLUSIVE OR gates 42 and 43 with the data bit on lead 13. Thereby, EXCLUSIVE OR gates 42 and 43 respectively derive binary one values in response to a particular data bit on lead 13 leading and lagging the clock pulses supplied to lead 16.

If synchronization exists between a particular data bit on lead 13 and the square wave on lead 16, binary signals having the same values are derived by EXCLUSIVE OR gates 42 and 43 at the end of the particular data bit. For this situation, the output signals of EXCLUSIVE OR gates 42 and 43 can be a zero or one, depending upon the value of the data bit. In particular, a zero value for the binary bit on lead 13 results in binary zero values being derived from EXCLUSIVE OR gates 42 and 43, because both inputs of both gates are zero. If, however, the particular data bit has a binary one value, EXCLUSIVE OR gates 42 and 43 derive binary one signals because the two inputs of both of gates 42 and 43 differ from each other.

If, however, there is a bit missynchronization so that a binary one data bit on lead 13 leads the wave on lead 16, the binary zero and one values respectively supplied by comparator 37 to leads 38 and 39 are combined in EXCLUSIVE OR gates 42 and 43 with the binary value on lead 13. Thereby, EXCLUSIVE OR gates 42 and 43 respectively derive binary one and zero values. If a binary zero data bit on lead 13 leads the clock wave on lead 16, the binary one and zero values supplied by comparator 37 to leads 38 and 39 are respectively combined in EXCLUSIVE OR gates 42 and 43 again with the binary zero data bit value on lead 13. Thereby, EXCLUSIVE OR gates 42 and 43 respectively derive binary one and zero values. Thus, binary one and zeros are respectively derived from EXCLUSIVE OR gates 42 and 43 in response to the data bit on lead 13 leading the clock wave on lead 16, regardless of the value of the data bit on lead 13. A similar analysis indicates that if the data bit on lead 13 lags the clock wave on lead 16 binary zero and one values are derived from EXCLUSIVE OR gates 42 and 43, regardless of the value of the data bit on lead 13.

After any transients associated with strobbing of second half latch network 34 and the resulting activation of comparator 37 have subsided, the binary values derived from EXCLUSIVE OR gates 42 and 43 are sampled and held during the following binary bit unless the first half bit values on bus 35 equal the second half bit values on bus 36. To these ends, the binary output signals of EXCLUSIVE OR gates 42 and 43 are supplied to D input terminals of D flip-flops 44 and 45, which function as one bit latch networks. Flip-flops 44 and 45 include clock input terminals, driven in parallel by the signal on lead 28 to be response to edge EOBD.

Reset input terminals (R) of flip-flops 44 and 45 are driven in parallel by the signal on lead 40, having a binary one value when the signals on busses 38 and 39 are equal. A binary one value on lead 40 prevents the clock inputs of flip-flops 44 and 45 from being enabled. Thereby, binary zero values are derived from flip-flops 44 and 45, so that binary zero values are supplied to leads 18 and 19. The binary zero values derived from flip-flops 44 and 45 when the signals on busses 35 and 36 are equal, to signal synchronization, prevent jitter of the output of oscillator 15.

If there is a binary zero on lead 40, the clock inputs of flip-flops 44 and 45 are enabled. In response to the positive going, trailing edge EOBD on lead 28 being supplied to the clock input terminals of flip-flops 44 and 45 and a binary zero on lead 40, the output signals of EXCLUSIVE OR gates 42 and 43 are sampled and held in flip-flops 44 and 45. Flip-flops 44 and 45 include Q output terminals on which are derived binary signals respectively commensurate with the sampled values at the outputs of gates 42 and 43. The binary signals at the Q output terminals of flip-flops 44 and 45 are maintained for the duration of the next data bit on lead 13. The binary values on the Q output terminals of flip-flops 44 and 45 during the next data bit on lead 13 are commensurate with the relative phase indications derived by EXCLUSIVE OR gates 42 and 43 as a result of the preceding data bit on lead 13.

The binary signals derived by D flip-flops 44 and 45 control whether oscillator 15 is to increment the reference frequency, decrement the reference frequency or maintain the reference frequency constant. However, to achieve stability, oscillator 15 can not change the reference frequency until the net number of leading data bits exceeds the net number of lagging data bits by a predetermined number, such as seven; conversely, no change in the reference frequency occurs until the net number of lagging data pulses exceeds the net number of leading data pulses. If there is a low amplitude oscillation between the leading and lagging states of the binary bits on lead 13, relative to the clock wave on lead 16, no change in the frequency of source 17 occurs.

To these ends, the lead and lag indicating signals derived from D flip-flops 44 and 45 are respectively applied to down and up input terminals of up-down preset counter 46. Counter 46 is preset to a mid range value thereof. The counter is decremented and incremented in response to binary one values being respectively applied to the down and up input terminals thereof.

Counter 46 includes borrow and carry output terminals, on which are respectively derived binary one signals in response to the counter being respectively driven to the zero and highest counts thereof. To prevent bias in the derivation of signals on the borrow and carry outputs of counter 46, the counter has an odd number of count stages; for example, counter 46 counts between zero and six, and is preset to a count of three. In this example, if a net of three binary ones are supplied to the down input of counter 46 relative to the up input of the counter, the counter derives a binary one signal on the borrow output terminal thereof. Conversely, in response to three net up input pulses being supplied to counter 46 relative to the number of down input pulses supplied to the counter, the counter derives a binary one signal on the carry output thereof.

Counter 46 can not be incremented or decremented in response to first and second consecutive data bits on lead 13 having the same value. This feature prevents possible erroneous operation. When the second consecutive data bit having the same value as the previous data bit occurs, the output signals of flip-flops 44 and 45 are not coupled to the up and down inputs of counter 46. To this end, the output signals of flip-flops 44 and 45 are respectively supplied to the up and down input terminals of counter 46 by AND gates 47 and 48.

AND gates 47 and 48 are enabled in response to the output of network 51 on lead 52 to pass the output signals of flip-flops 44 and 45 to the input terminals of counter 46 only if the values of successive data bits on lead 13 differ from each other. To these ends, network 51 includes input terminals 53 and 54, respectively connected to respond to the IMID pulse on lead 25 and the data bit on lead 13. The data signal supplied to terminal 54 is applied to a D input terminal of latching, D flip-flop 55, having a clock input responsive to the IMID edge supplied by generator 23 to lead 25. In response to the positive going, leading IMID edge, the binary bit value on lead 13 is sampled and held by flip-flop 55, having a Q output supplied to one input of EXCLUSIVE OR gate 57; gate 57 has a second input responsive to the data bit on lead 13, as coupled to terminal 54. EXCLUSIVE OR gate 57 derives an output that is coupled to one input of AND gate 59, having a second input directly coupled to terminal 53 so the gate is enabled by the IMID edge.

In response to a transition occurring between first and second consecutive data bits on lead 13, EXCLUSIVE OR gate 57 supplies a binary one signal to AND gate 59 during the interval between the end of the first data bit and the middle of the second data bit. In contrast, if there is no change in the value of successive data bits on lead 13, a binary zero is derived by EXCLUSIVE OR gate 57 in the interval between the end of the first data bit and the middle of the second data bit. The binary one and zero values derived by EXCLUSIVE OR gate 57 are sampled in the middle of the second data bit, by virtue of gate 59 being at that time enabled by the IMID edge. In response to the first and second bits having different values, AND gate 59 supplies a binary one enabling signal to lead 52 when edge IMID is derived. The binary one signal on lead 52 enables the values in latching, D flip-flops 44 and 45 to be coupled through AND gates 47 and 48 to the down and up input terminals of counter 46. In contrast, if the first and second data bits have the same values, gate 59 supplies a binary zero signal to lead 52 when edge IMID is derived, so the up and down terminals of counter 46 are static.

In response to counter 46 supplying binary one signals to the carry and borrow output terminals thereof, binary one signals are respectively supplied to leads 18 and 19 to reset the counter to the mid range thereof. This instigates a new operating cycle of counter 46. To these ends, the signals on the carry and borrow output terminals of counter 46 are respectively supplied to swallower type pulse generators 61 and 62. Pulse generators 61 and 62 respond to the positive going edge IMIDD, supplied by pulse generator 23 to lead 27. Thereby, pulse generators 62 and 63 respond to the signals on the carry and borrow output terminals of counter 46 after all transients have subsided. In response to either of pulse generators 61 or 62 deriving a binary one signal, counter 46 is reset to the mid range value by coupling the outputs of pulse generators 61 and 62 to clear and reset input terminal of counter 46 by way of OR gate 63. The signals derived by swallower pulse generators 61 and 62 are supplied directly to leads 18 and 19, to control the frequency of the square wave on lead 22 so that a binary one on lead 18 increments the reference frequency of oscillator 15 from $f_0$ to $f_0 + \Delta f_1$, while a binary one on lead 19 decrements the oscillator reference frequency to $f_0 - \Delta f_2$.

The square wave supplied by oscillator 15 to lead 22 enables the binary value of each bit supplied by converter 12 to lead 13 to be determined. To these ends, the square wave on lead 22 is supplied to a clock input of sixteen bit accumulator register 71, having a data input connected to lead 13. The 16 square waves on lead 22 during a particular data bit on lead 13 sample the binary value of the data bit sixteen times during the data bit. At the end of the data bit, accumulator 71 thus stores 16 bits. In a perfect noiseless system wherein there is perfect synchronization between the signal on lead 13 and the clock on lead 16, all sixteen bits in accumulator 71 have the same value. In an actual system, however, wherein there is likely to be noise, the sixteen bits in accumulator 71 may not have the same value. The value of the sixteen bits in accumulator 71 is compared in comparator 72 with a threshold value for the value of a binary one value, as stored in data recovery threshold read only memory 73. The comparison is performed immediately after each data bit on lead 13 has terminated.

To these ends, accumulator 71 and read only memory 73 respectively supply sixteen bit signals to comparator 72 by way of sixteen bit busses 74 and 75. The signal on bus 75 is constantly supplied to comparator 72, while the signal on bus 74 changes immediately after each data bit on lead 13 has terminated. The contents of accumulator 71 are read out into a buffer (included in comparator 72) at the end of each data bit on lead 13, in response to the EOB edge on lead 26 that is supplied to a readout input of the accumulator. The previous bit values stored in accumulator 71 are then cleared from the accumulator in response to the positive going delayed EOBD edge on lead 28 that is supplied to a clear input of the accumulator.

Figure 2:
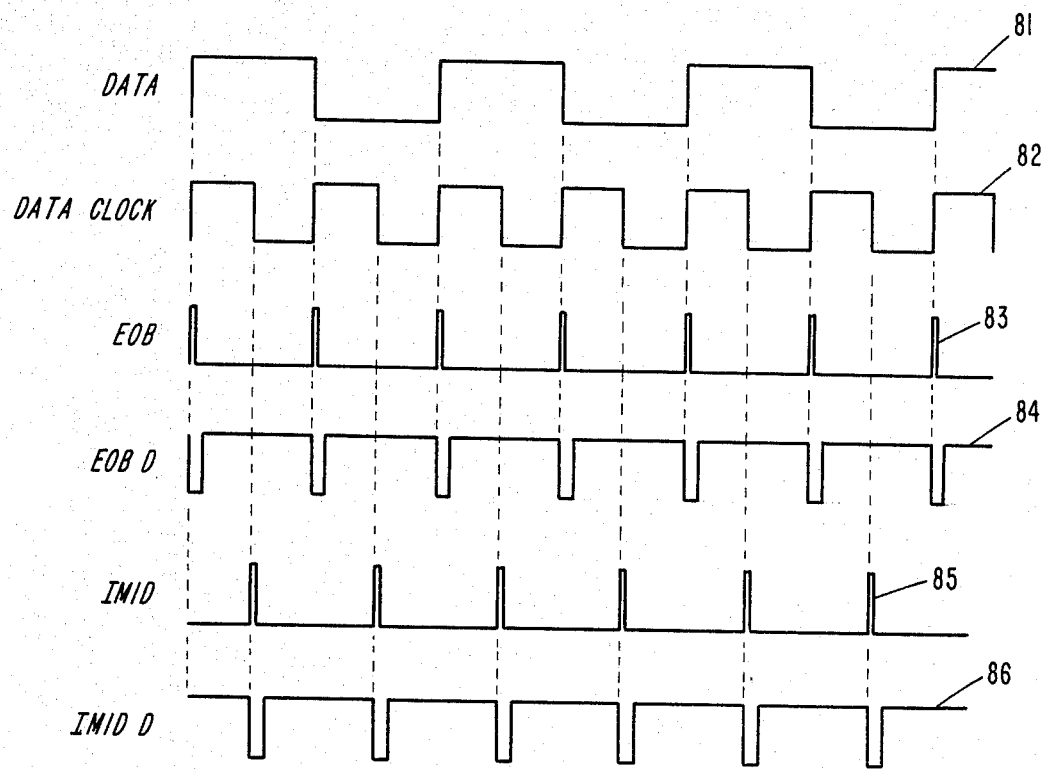
FIG. 2 is a series of waveforms useful in helping to describe the operation of FIG. 1.

As indicated by the waveforms of FIG. 2, when the non-return to zero data bits on lead 13, as indicated by waveform 81, are synchronized to the clock square wave 82 on lead 16, oscillator 15 is controlled so that the leading, positive going edges of waveform 81 are time coincident with alternate positive going edges of square wave 82. The negative going, trailing edges of data waveform 81 are synchronized with the remaining positive going edges of clock waveform 82.

The leading edges EOB of the end of bit pulses in waveform 83 are time coincident with the positive and negative going edges at the end of each of the binary data bits of waveform 81. The positive going, trailing edges EOBD of delayed end of bit waveform 84 are time delayed relative to the positive going, leading edges EOB of end of bit waveform 83. The positive going edges IMID of mid bit waveform 85 are synchronized with the trailing edges of clock waveform 82, and therefore occur in the middle of the data bits of waveform 81. The delayed positive going edges IMIDD of delayed mid bit waveform 86 occur after the positive going edges IMID of waveform 85.

A preferred embodiment of digital controlled oscillator 15 is disclosed in the co-pending, commonly assigned U.S. patent application Ser. No. 225,721, filed Jan. 16, 1981, entitled Pulse Control Circuit, and illustrated herein in FIG. 3. Digital controlled oscillator 15 includes reference oscillator 111 which drives dual modulus counter 112 and reference divider 113 in parallel. The output of frequency divider 113 is applied to a clock input of accumulator 114, having a capacity M. The frequency division factor of frequency divider 113 is $K_1$. Dual modulus counter 112 selectively divides the frequency $F_{REF}$ of oscillator 111 by a factor of $K_2$ or $(K_2+1)$, depending upon the value of a control signal supplied to the counter by modulus controller 115. Modulus controller 115 responds to a carry output of accumulator 114. Accumulator 114 is preloaded with a value N, selectively determined by the values of the binary signals on leads 18 and 19.

Modulus controller 115 responds to the output signal of accumulator 114 and the output frequency of dual modulus counter 112 to control the modulus or frequency division factor introduced by counter 112 on the output of reference oscillator 111. It is shown in the co-pending, commonly assigned application that the frequency supplied by counter 112 to modulus controller 115 is:

$$f_0 = \frac{F_{REF}}{K_2}\left(1 - \frac{N}{K_1 M}\right)$$

where

N is the magnitude of the signal preloaded into an accumulator 114,

M is the maximum capacity of accumulator 114, $K_2$ is the modulus or frequency division factor of counter 112 when controller 115 supplies a binary zero signal to it, and $K_1$ is the frequency division factor of frequency divider 113.

From the foregoing, it is apparent that changing the value of N controls the frequency derived from dual modulus counter 112. Dual modulus counter 112 is returned to the normal $K_2$ state thereof from the $K_2+1$ state thereof in response to N cycles being derived from counter $K_2$ while counter 112 is in the $K_2+1$ state. Thereby, the frequency derived from digital clock oscillator 15 can be controlled merely by controlling the value of N supplied to accumulator 114.

To these ends, read only memories 121, 122 and 123 store binary values causing clock oscillator 115 to derive a signal having a frequency: (a) equal to 16 times the bit rate of the data bits on lead 13, (b) sixteen times the bit rate of the data on lead 13 plus $\Delta f_1$, and (c) sixteen times the bit rate of the data on lead 13 minus $\Delta f_2$. The binary values in read only memories 121, 122 and 123 are respectively coupled through gates 124, 125 and 126 to a common bus 127. Gates 124, 125 and 126 are respectively enabled in response to binary zero signals simultaneously on leads 18 and 19, binary zero and one signals respectively on leads 18 and 19, and binary one and zero signals respectively on leads 18 and 19. The signals on leads 18 and 19 are applied in parallel to AND gates 127, 128 and 129. AND gate 127 includes a pair of inverting input terminals connected to leads 18 and 19, so that AND gate 127 derives a binary one signal in response to binary zero values being on both leads 18 and 19. The binary one output of gate 127 enables gate 124 to feed the signal in read only memory 121 to a load input terminal of accumulator 114. AND gate 128 includes noninverting and inverting input terminals, respectively connected to leads 18 and 19, so that the AND gate derives a binary one output signal in response to a binary one being on lead 18 and a binary zero being on lead 19. The binary one output of AND gate 128 enables gate 126 to feed the frequency indicating signal stored in read only memory 123 to the load input of accumulator 114. Similarly, AND gate 129 includes inverting and noninverting input terminals respectively connected to leads 18 and 19, so that gate 129 derives a binary one signal in response to binary zero and one values being on leads 18 and 19. The binary one output of AND gate 129 enables gate 125 so that the frequency indicating signal in read only memory 122 is coupled to the load input of accumulator 114.

Figure 4:
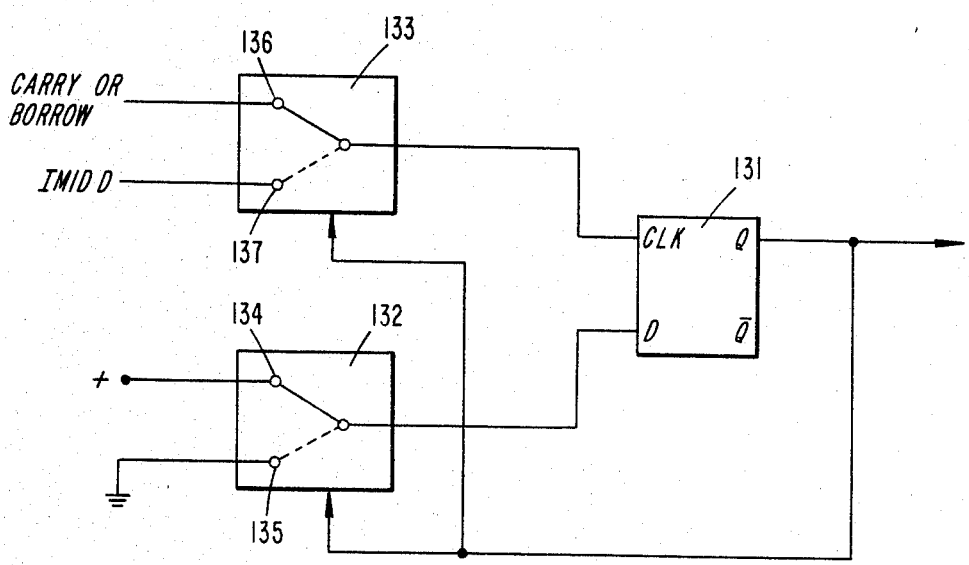
FIG. 4 is a block diagram of a swallower included in the circuit of FIG. 1.

Reference is now made to FIG. 4 of the drawing, a circuit diagram of one of identical swallower pulse generators 61 and 62. Swallower pulse generators 61 and 62 are respectively responsive to the carry and borrow outputs of up/down counter 46. Both of swallower pulse generator 61 and 62 are responsive to the positive going, trailing edge IMIDD of the delayed mid pulse supplied by generator 23 to lead 27. Each of swallower pulse generators 61 and 62 responds alternately to the two inputs thereof, to derive a delayed binary signal indicative of the binary value of the particular input signal to which the pulse generator is responsive.

To these ends, the swallower pulse generator illustrated in FIG. 4 includes D flip-flop 131 having clock and D input terminals and a Q output terminal. Signals are respectively supplied to the clock and D input terminals of flip-flop 131 by way of electronic toggle switches 132 and 133. The states of toggle switches 132 and 133 are controlled by the Q output of flip-flop 131 so that in response to each transition at the Q output of flip-flop 131, the states of toggle switches 132 and 133 are simultaneously reversed.

Toggle switch 132 includes input terminals 134 and 135 respectively connected to positive DC and ground potentials. Toggle switch 133 includes input terminals 136 and 137, respectively connected to an output of counter 46 and the IMIDD signal supplied by pulse generator 23 to lead 27. Terminal 136 of swallower pulse generator 61 is connected to the carry output terminal of counter 46, while terminal 136 of swallow pulse generator 62 is connected to the borrow output of counter 46. Toggle switches 132 and 133 are activated in response to the Q output of flip-flop 131 so that the signals at terminals 134 and 136 are respectively coupled to the D and clock input terminals of flip-flop 131 at the same time. In response to a transition occurring in the output of flip-flop 131, toggle switches 132 and 133 are activated so that the signals at terminals 135 and 137 are respectively coupled to the D and clock input terminals of flip-flop 131.

To consider the operation of FIG. 4, assume that toggle switches 132 and 133 are in the states illustrated, i.e., terminals 134 and 136 coupled to the D and clock terminals of flip-flop 131, and that the Q output of flip-flop 131 is equal to zero. The circuit stays in the stated condition until a binary one signal is supplied by the carry or borrow output of flip-flop 46 to terminal 135. In response to a binary one signal being supplied to terminal 136, flip-flop 131 changes state so that a binary one level is derived at the Q output of the flip-flop, in response to the positive voltage at terminal 134. The resulting positive going transition at the Q output of flip-flop 131 is supplied as a control input to toggle switches 132 and 133, to change the states of the toggle switches.

In the changed states of toggle switches 132 and 133, the ground potential at terminal 135 is applied to the D input of flip-flop 131, while signal IMIDD is coupled by way of terminal 137 to the clock input of flip-flop 131. Flip-flop 131 stays in the indicated state until the positive going edge IMIDD is supplied by pulse generator 23 to lead 127. In response to edge IMIDD being coupled from terminal 137 to the clock input of flip-flop 131, the state of flip-flop 131 changes so that a binary zero level is derived at the Q output thereof.

The positive to negative going transition at the Q output of flip-flop 131 is coupled as a control input to toggle switches 132 and 133. The positive to zero negative going transition causes toggle switches 132 and 133 to revert to the original, illustrated condition. Thus, a binary one level is derived at the Q output of flip-flop 131 for the interval between the original derivation of a carry or borrow indicating pulse by counter 46 and the occurrence of the delayed positive going IMIDD edge supplied by generator 23 to lead 27. The binary one value derived by flip-flop 131 is supplied by each of swallower pulse generators 61 and 62 to OR gate 63, thence to the clear input of counter 46. The binary one value derived by swallower pulse generator 61 is directly coupled to lead 18 to increment the reference frequency of oscillator 17, while the binary one output of flip-flop 131 included in swallower pulse generator 62 is coupled to lead 19, to decrement the frequency derived by source 17.

While there has been described and illustrated one specific embodiment of the invention, it will be clear that variations in the details of the embodiment specifically illustrated and described may be made without departing from the true spirit and scope of the invention as defined in the appended claims.

We claim:

1. Apparatus for synchronizing a clock wave normally having a reference frequency to the frequency of serial binary data bits comprising digital circuit means responsive to the data bits for deriving the clock wave by selectively (a) incrementing the reference frequency, (b) decrementing the reference frequency and (c) not changing the reference frequency, the digital circuit means including: means responsive to the derived clock wave for dividing each data bit into an even number of sub bits so that in each data bit there are (a) a first half of the divided sub bits and (b) the remaining sub bits of the data bit which comprises a second half of the divided sub bits, means for comparing the binary value associated with the first half of the divided sub bits of a particular data bit with the binary value associated with the remaining, second half of the divided sub bits of the particular data bit, and control means responsive to the derived clock wave and the comparing means for: (a) incrementing the reference frequency in response to a first relation between the relative binary values of the first and second halves, (b) decrementing the reference frequency in response to a second relation between the relative binary values of the first and second halves, and (c) not changing the feference frequency when the binary values associated with the first and second halves are equal.

2. The apparatus of claim 1 wherein the means for comparing includes a magnitude comparator for deriving first and second complementary output signals, the first and second signals respectively having first and second binary values in response to the binary value associated with the first half exceeding the binary value associated with the second half and having second and first values in response to the binary value associated with the second half exceeding the binary value associated with the first half, and first and second EXCLUSIVE OR gate means respectively responsive to the first and second signals and the data bits for deriving first and second output signals for controlling the control means.

3. The apparatus of claim 1 wherein the control means includes means for incrementing the reference frequency only in response to the number of data bits causing the reference frequency to be incremented exceeding the number of data bits causing the reference frequency to be decremented by a predetermined value in excess of one, and means for decrementing the reference frequency only in response to the number of data bits causing the reference frequency to be decremented exceeding the number of data bits causing the reference frequency to be incremented by a predetermined magnitude in excess of one.

4. The apparatus of claim 1 wherein the control means includes means for stepwise incrementing and decrementing the reference frequency.

5. The apparatus of claim 1 wherein the control means includes means for stepwise incrementing and decrementing the reference frequency for only one data bit period and for then deriving the clock wave at the reference frequency for at least one data bit period.

6. The apparatus of claim 1 wherein the control means includes means for preventing incrementing and decrementing of the reference frequency and for causing the frequency of the clock wave to be the reference frequency in response to successive data bits having the same value.

7. The apparatus of claim 6 wherein the control means includes means for only stepwise incrementing and decrementing the reference frequency.

8. The apparatus of claim 6 wherein the control means includes means for stepwise incrementing and decrementing the reference frequency for only one data bit period and for then deriving the clock wave at the reference frequency for at least one data bit period.

9. The apparatus of claim 1 wherein the means for comparing includes a magnitude comparator for deriving first and second complementary output signals and for deriving a third signal, the third signal having a first value in response to the binary value associated with the first half being equal to the binary value associated with the second half, means responsive to the data bit and the first and second signals for controlling incrementing and decrementing of the reference frequency, the first and second signals respectively having first and second binary values in response to the binary value associated with the first half exceeding the binary value associated with the second half and having second and first values in response to the binary value associated with the second half exceeding the binary value associated with the first half, and means responsive to the third signal having the first value for inhibiting incrementing and decrementing of the reference frequency and for causing the clock wave to be at the reference frequency.

10. The apparatus of claim 1 further including means for deriving a synchronizing signal when each data bit begins, and means responsive to the synchronizing signal for synchronizing the clock wave to the beginning of each data bit.

11. Apparatus for synchronizing a clock wave to the frequency of serial data bits comprising oscillator means for normally deriving 2N clock impulses during each data bit, an N bit accumulator register having a data input responsive to the serial data bits and clocked by the clock impulses, means responsive to the clock wave for deriving first and second signals respectively synchronized with the middle and end of each data bit, means for comparing the binary value of the N bits in the register when the first signal is derived with the binary value of the N bits in the register when the second signal is derived, the comparing means deriving indications of the relative binary values of the N bits in the register when the first and second signals are derived, means responsive to the indications and each of the data bits for controlling the frequency of the clock wave so the clock wave has: (a) a reference frequency when the means for comparing indicates the compared binary values are equal, (b) a frequency greater than the reference frequency when the means for comparing and each data bit indicates that the data bit lags the clock wave, and (c) a frequency less than the reference frequency when the means for comparing and each data bit indicates that the data bit leads the clock wave.

12. The apparatus of claim 11 wherein the comparing means includes means for deriving third and fourth signals, the third signal having a first value in response to the N bits in the register having a value when the first signal is derived that exceeds the value when the second signal is derived, the fourth signal having a first value in response to the N bits in the register having a value when the second signal is derived that exceeds the value when the first signal is derived, the clock wave controlling means including first and second EXCLUSIVE OR gate means respectively responsive to the third and fourth signals and the data bits for deriving first and second output signals for controlling the control means, the first and second output signals respectively causing the clock wave to have frequencies greater and less than the reference frequency.

13. The apparatus of claim 11 wherein the control means includes means for incrementing the reference frequency only in response to the number of data bits causing the reference frequency to be incremented exceeding the number of data bits causing the reference frequency to be decremented by a predetermined value in excess of one, and means for decrementing the reference frequency only in response to the number of data bits causing the reference frequency to be decremented exceeding the number of data bits causing the reference frequency to be incremented by a predetermined magnitude in excess of one.

14. The apparatus of claim 11 wherein the control means includes means for stepwise incrementing and decrementing the reference frequency.

15. The apparatus of claim 11 wherein the control means includes means for stepwise incrementing and decrementing the reference frequency for only one data bit period and for then deriving the clock wave at the reference frequency for at least one data bit period.

16. The apparatus of claim 11 wherein the control means includes means for preventing incrementing and decrementing of the reference frequency and for causing the frequency of the clock wave to be the reference frequency in response to successive data bits having the same value.

17. The apparatus of claim 16 wherein the control means includes means for only stepwise incrementing and decrementing the reference frequency.

18. The apparatus of claim 17 wherein the control means includes means for stepwise incrementing and decrementing the reference frequency for only one data bit period and for then deriving the clock wave at the reference frequency for at least one data bit period.

19. Apparatus for synchronizing a clock wave normally having a reference frequency to the frequency of serial binary data bits comprising digital circuit means responsive to the data bits for deriving the clock wave by selectively (a) incrementing the reference frequency, (b) decrementing the reference frequency and (c) not changing the reference frequency, the digital circuit means including: means responsive to the derived clock wave for dividing each data bit into nN sub bits so that each data bit is divided into n groups of N sub bits, means for comparing the binary values associated with the n groups of N sub bits with each other, and control means responsive to the derived clock wave and the comparing means for: (a) not changing the reference frequency when the binary values associated with the N bits of each of the n sub groups are the same, (b) incrementing the reference frequency when the binary values associated with the N bits of each of the n sub groups have a first relation different from being the same, and (c) decrementing the reference frequency when the binary values associated with the N bits of each of the n sub groups have a second relation different from being the same.

* * * * *